United States Patent
Nagasaka et al.

(10) Patent No.: US 9,629,049 B2
(45) Date of Patent: Apr. 18, 2017

(54) USER EQUIPMENT, COMMUNICATION CONTROL METHOD AND CHIPSET

(71) Applicant: KYOCERA CORPORATION, Kyoto (JP)

(72) Inventors: Yushi Nagasaka, Yokohama (JP); Masato Fujishiro, Yokohama (JP); Hiroyuki Adachi, Kawasaki (JP); Kugo Morita, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/251,602

(22) Filed: Aug. 30, 2016

(65) Prior Publication Data

US 2016/0373982 A1 Dec. 22, 2016

Related U.S. Application Data

(63) Continuation of application No. PCT/JP2015/072241, filed on Aug. 5, 2015.
(Continued)

(51) Int. Cl.
*H04W 48/16* (2009.01)
*H04W 36/14* (2009.01)
(Continued)

(52) U.S. Cl.
CPC .......... *H04W 36/14* (2013.01); *H04W 36/24* (2013.01); *H04W 84/042* (2013.01); *H04W 84/12* (2013.01)

(58) Field of Classification Search
CPC . H04W 12/06; H04W 28/08; H04W 36/0005; H04W 36/0088; H04W 76/04;
(Continued)

(56) References Cited

U.S. PATENT DOCUMENTS

| 2015/0038142 A1* | 2/2015 | Wang | H04W 48/12 455/436 |
| 2015/0092553 A1* | 4/2015 | Sirotkin | H04W 48/16 370/235 |

(Continued)

OTHER PUBLICATIONS

International Search Report issued in PCT/JP2015/072241; mailed Oct. 27, 2015.
(Continued)

*Primary Examiner* — Mohamed Kamara
(74) *Attorney, Agent, or Firm* — Studebaker & Brackett PC

(57) ABSTRACT

A UE performs a first communication with a base station provided in a cellular communication network and performs a second communication with an access point provided in a WLAN. The UE performs a cellular/WLAN interworking to perform a switch between the first communication and the second communication. The UE performs the switch between the first communication and the second communication based on a RAN assistance parameter provided from the cellular communication network. The UE determines, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

8 Claims, 6 Drawing Sheets

Related U.S. Application Data

(60) Provisional application No. 62/034,618, filed on Aug. 7, 2014.

(51) Int. Cl.
*H04W 36/24* (2009.01)
*H04W 84/04* (2009.01)
*H04W 84/12* (2009.01)

(58) Field of Classification Search
CPC ..... H04W 48/12; H04W 48/18; H04W 48/20; H04W 72/02; H04W 72/04; H04W 72/06; H04W 72/1252; H04W 84/042; H04W 68/12; H04W 48/16
See application file for complete search history.

(56) References Cited

U.S. PATENT DOCUMENTS

2016/0043937 A1* 2/2016 Phuyal ............... H04W 76/026
370/329
2016/0255533 A1* 9/2016 Sirotkin ............... H04W 48/16

OTHER PUBLICATIONS

Written Opinion issued in PCT/JP2015/072241; mailed Oct. 27, 2015.

3rd Generation Partnership Project; Technical Specification Group Radio Access Network; Evolved Universal Terrestrial Radio Access (E-UTRA); User Equipment (UE) procedures in idle mode; 3GPP TS 36.304 V12.1.0; Jun. 2014; pp. 1-35; Release 12; 3GPP Organizational Partners.

Office Action issued by the Japanese Patent Office on Jan. 10, 2017 in corresponding Japanese Application No. 2016-540264 with concise statement of relevance; 3 pp.

Intel Corporation; "TP for 25.300 WLAN/3GPP radio interworking"; 3GPP TSG-RAN Wg2 Meeting #86; R2-142135; Seoul, Korea, May 19-23, 2014; 4 pp.

* cited by examiner

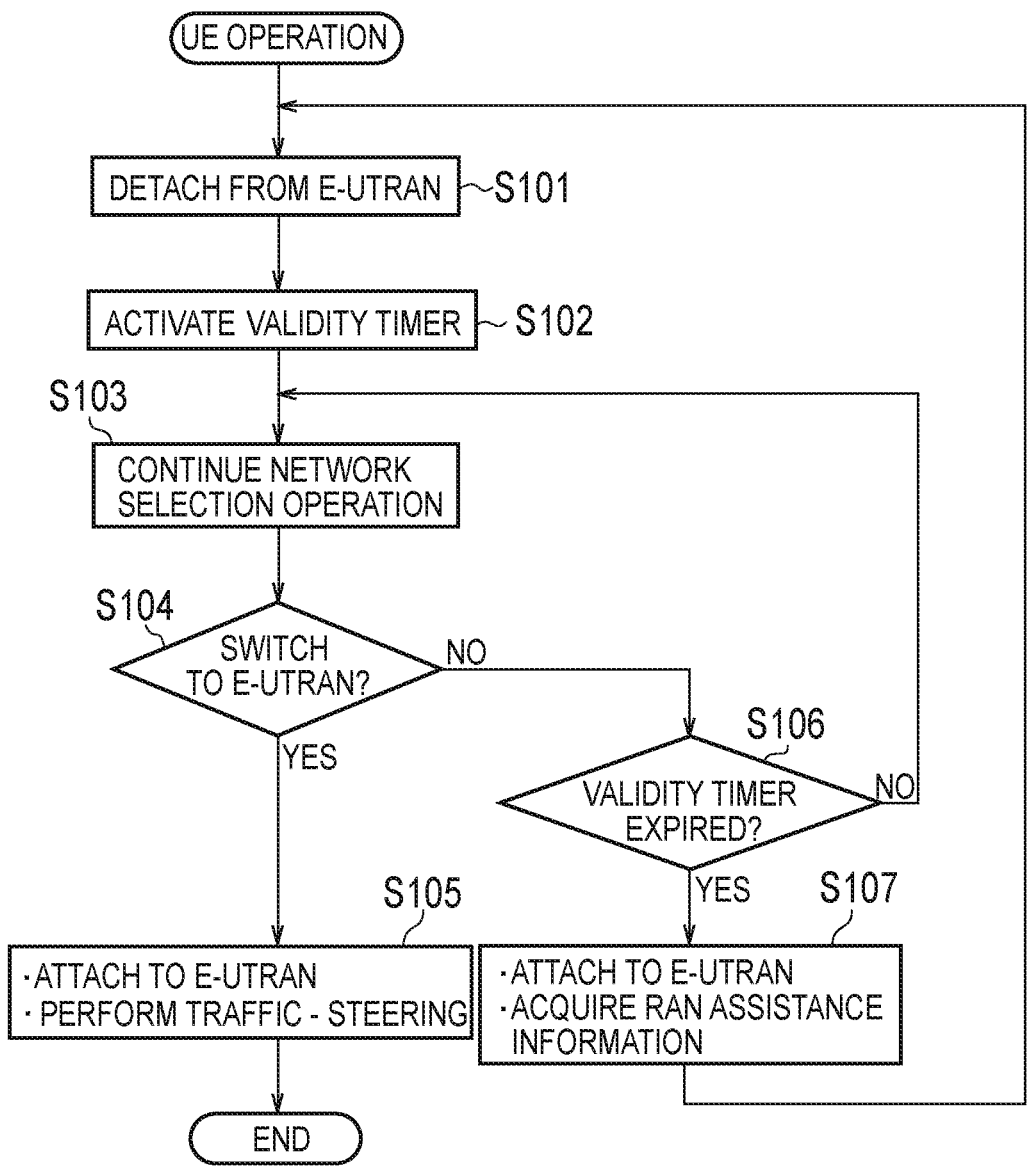

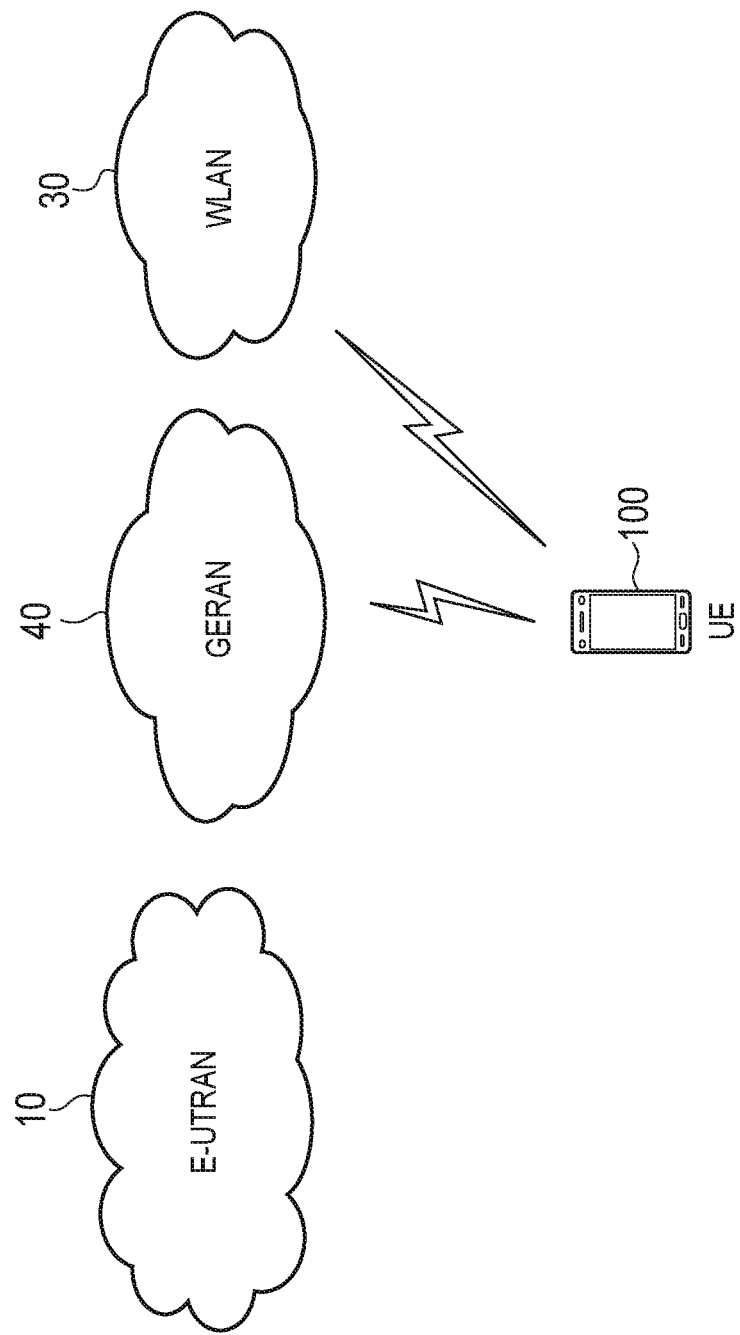

USER EQUIPMENT, COMMUNICATION CONTROL METHOD AND CHIPSET

RELATED APPLICATIONS

This application is a continuation application of international application PCT/JP2015/072241, filed Aug. 5, 2015, which claims benefit of U.S. Provisional Patent Application No. 62/034,618 (filed on Aug. 7, 2014), the entirety of both applications hereby expressly incorporated by reference.

TECHNICAL FIELD

The present invention relates to a user terminal supporting a cellular/WLAN radio interworking technology, a communication control method and a chipset.

BACKGROUND ART

A specification of 3GPP (3rd Generation Partnership Project), which is a project aiming to standardize a cellular communication technology, supports a cellular/WLAN (Wireless Local Area Network) radio interworking technology in Release 12 and later.

With such a technology, a user terminal performs, on the basis of assistance information provided from a cellular communication network (RAN assistance parameters), a network selection operation for selecting an appropriate network, from the cellular communication network and a WLAN communication network, through which to transmit and receive traffic of the user terminal. The assistance information is appropriately updated according to a state of the cellular communication network and the like.

PRIOR ART DOCUMENTS

Non Patent Document

[Non Patent Document 1] 3GPP Technical Specification "TS 36.304 V12.1.0"

SUMMARY

A user equipment according to a first aspect comprises: a first communication unit configured to perform a first communication with a base station provided in a cellular communication network; a second communication unit configured to perform a second communication with an access point provided in a WLAN (Wireless Local Area Network); and a controller configured to perform a cellular/WLAN interworking to perform a switch between the first communication and the second communication. The controller is further configured to perform the switch between the first communication and the second communication based on a RAN (Radio Access Network) assistance parameter provided from the cellular communication network. The controller is configured to determine, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

A communication control method according to a second aspect comprises the steps of: (a) performing a first communication with a base station provided in a cellular communication network; (b) performing a second communication with an access point provided in a WLAN (Wireless Local Area Network); and (c) performing a cellular/WLAN interworking to perform a switch between the first communication and the second communication. The step (c) includes a step of performing the switch between the first communication and the second communication based on a RAN (Radio Access Network) assistance parameter provided from the cellular communication network. The step (c) includes a step of determining, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

A chipset according to a third aspect is a chipset used for a user equipment comprising a first communication unit configured to perform a first communication with a base station provided in a cellular communication network and a second communication unit configured to perform a second communication with an access point provided in a WLAN (Wireless Local Area Network). The chipset comprises: a controller configured to perform a cellular/WLAN interworking to perform a switch between the first communication and the second communication. The controller is further configured to perform the switch between the first communication and the second communication based on a RAN (Radio Access Network) assistance parameter provided from the cellular communication network. The controller is further configured to determine, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

BRIEF DESCRIPTION OF DRAWINGS

FIG. 6 is an operation flow diagram of the UE according to the embodiment.

FIG. 7 is a diagram illustrating an operation environment according to other embodiments.

DESCRIPTION OF EMBODIMENTS

Overview of Embodiment

Figure 1:
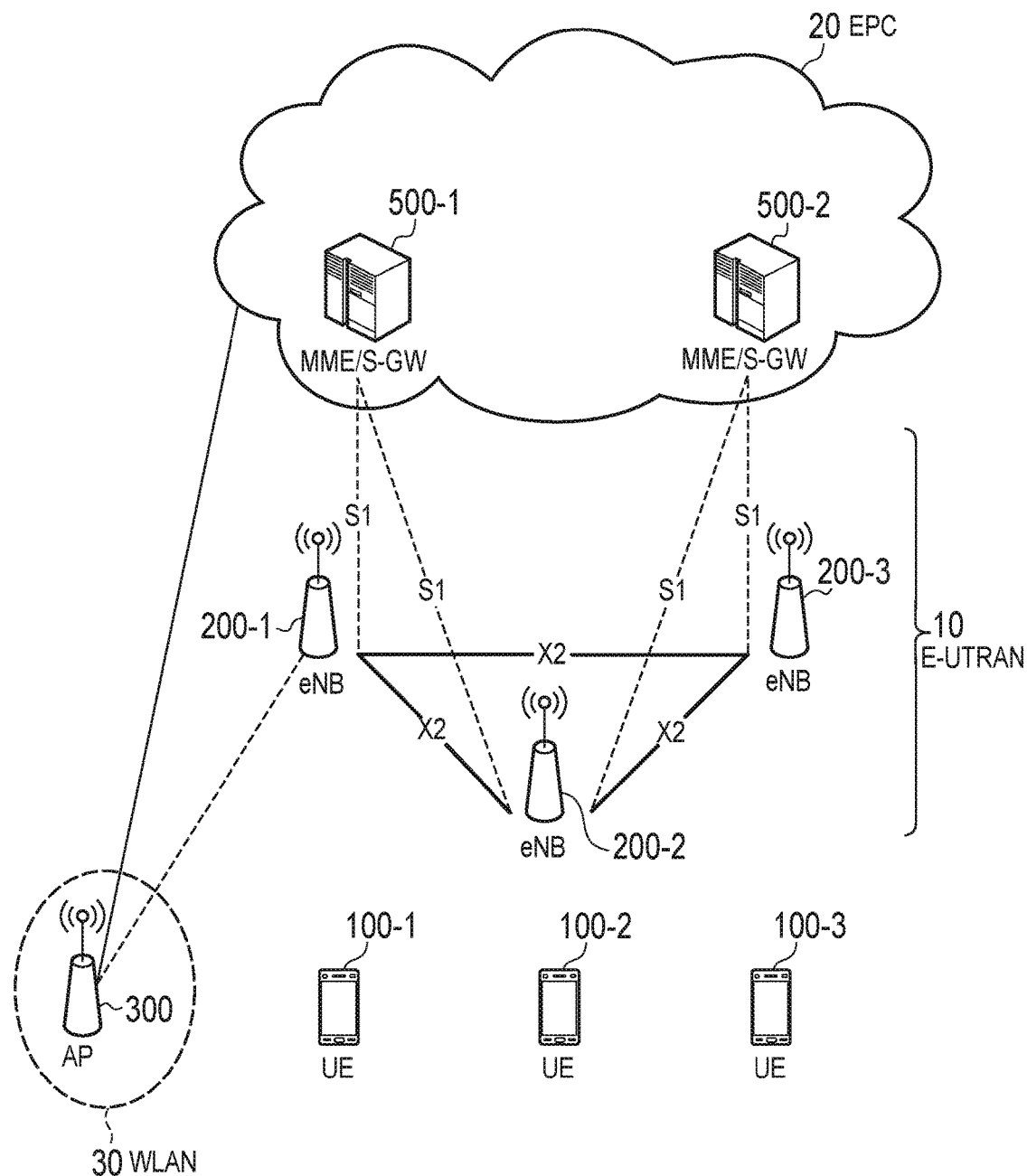
FIG. 1 is a diagram illustrating a system configuration according to an embodiment.

A user equipment according to one embodiment comprises: a first communication unit configured to perform a first communication with a base station provided in a cellular communication network; a second communication unit configured to perform a second communication with an access point provided in a WLAN (Wireless Local Area Network); and a controller configured to perform a cellular/WLAN interworking to perform a switch between the first communication and the second communication. The controller is further configured to perform the switch between the first communication and the second communication based on a RAN (Radio Access Network) assistance parameter provided from the cellular communication network. The controller is further configured to determine, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

In one embodiment, the controller is further configured to determine whether to perform the switch from the second communication to the first communication based on the first RAN assistance parameter until the elapse of the predetermined time.

In one embodiment, the controller is further configured to update the first RAN assistance parameter by the second RAN assistance parameter upon the elapse of the predetermined time.

In one embodiment, the second RAN assistance parameter is the RAN assistance parameter broadcasted from the cellular communication network when the user equipment is in an RRC (Radio Resource Connection) idle state.

In one embodiment, the first RAN assistance parameter is the RAN assistance parameter unicasted from the cellular communication network when the user equipment is in an RRC (Radio Resource Connection) connected state.

In one embodiment, the predetermined time is designated by the cellular communication network or preconfigured.

A communication control method according to one embodiment comprises the steps of: (a) performing a first communication with a base station provided in a cellular communication network; (b) performing a second communication with an access point provided in a WLAN (Wireless Local Area Network); and (c) performing a cellular/WLAN interworking to perform a switch between the first communication and the second communication. The step (c) includes a step of performing the switch between the first communication and the second communication based on a RAN (Radio Access Network) assistance parameter provided from the cellular communication network. The step (c) includes a step of determining, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

A chipset according to one embodiment is a chipset used for a user equipment comprising a first communication unit configured to perform a first communication with a base station provided in a cellular communication network and a second communication unit configured to perform a second communication with an access point provided in a WLAN (Wireless Local Area Network). The chipset comprises: a controller configured to perform a cellular/WLAN interworking to perform a switch between the first communication and the second communication. The controller is further configured to perform the switch between the first communication and the second communication based on a RAN (Radio Access Network) assistance parameter provided from the cellular communication network. The controller is further configured to determine, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

Embodiment

Below, with reference to the drawing, an embodiment will be described in which a cellular communication system (LTE system) configured to comply with the 3GPP standards is linked with a wireless LAN (WLAN) system.

(System Configuration)

FIG. 1 is a system configuration diagram according to an embodiment. As illustrated in FIG. 1, a cellular communication system includes a plurality of UEs (User Equipments) 100, an E-UTRAN (Evolved-UMTS Terrestrial Radio Access Network) 10, and an EPC (Evolved Packet Core) 20.

The E-UTRAN 10 corresponds to a cellular radio access network (RAN). The EPC 20 corresponds to a core network. The E-UTRAN 10 and the EPC 20 configures an LTE communication network (cellular communication network).

The UE 100 is a mobile-type radio communication device and performs radio communication with a cell with which a connection is established. The UE 100 corresponds to a user terminal. The UE 100 is a terminal (dual terminal) that supports both communication schemes of cellular communication and WLAN communication. The LTE communication is one type of WWAN (Wireless Wide Area Network) communications.

The E-UTRAN 10 includes a plurality of eNBs 200 (evolved Nodes-B). The eNB 200 corresponds to a base station. The eNB 200 manages one or a plurality of cells, and performs radio communication with the UE 100 with which a connection is established with a cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling, for example.

The eNBs 200 are connected with one another via an X2 interface. Further, the eNB 200 is connected via an S1 interface to an MME/S-GW 500 included in the EPC 20.

The EPC 20 includes a plurality of MMEs (Mobility Management Entities)/S-GWs (Serving-Gateways) 500. The MME is a network node that performs various mobility controls, etc., on the UE 100, and corresponds to a controller. The S-GW is a network node that performs control to transfer user data, and corresponds to a switching center.

The WLAN 30 (WLAN communication network) includes WLAN access points (hereinafter, briefly referred to as "APs") 300. For example, the AP 300 is an AP (Operator controlled AP) managed by a network operator of LTE system.

The AP 300 is configured to comply with various IEEE 802.11 specifications, for example. The AP 300 communicates with the UE 100 in a frequency band (WLAN frequency band) different from a cellular frequency band. Generally, the WLAN communication is performed at an unlicensed band. The LTE communication is performed at a licensed band. The AP 300 is connected, via a router, etc., to the EPC 20. In addition to a case where the eNB 200 and the AP 300 are individually located, the eNB 200 and the AP 300 may also be "Collocated". As one mode of the "Collocated", the eNB 200 and the AP 300 may be directly connected to each other through any interface of an operator.

The EPC 20 further includes an ANDSF (Access Network Discovery and Selection Function) server. The ANDSF server manages ANDSF information on WLAN and provides the UE 100 with the ANDSF information.

Figure 2:
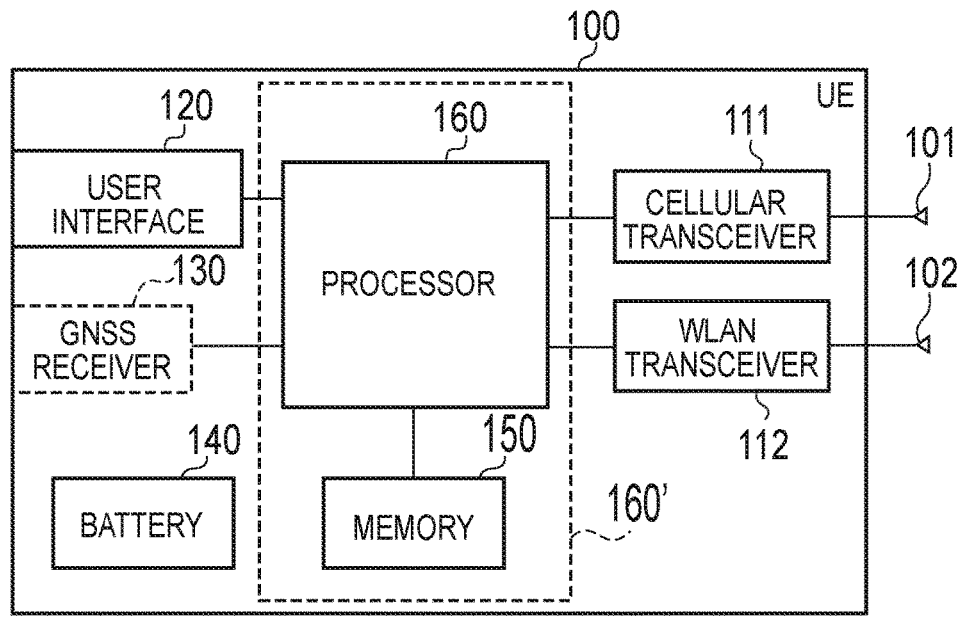
FIG. 2 is a block diagram of a UE according to the embodiment.

FIG. 2 is a block diagram of the UE 100. As illustrated in FIG. 2, the UE 100 includes: antennas 101 and 102; a cellular transceiver 111; a WLAN transceiver 112; a user interface 120; a GNSS (Global Navigation Satellite System) receiver 130; a battery 140; a memory 150; and a processor 160. The memory 150 and the processor 160 configure a controller. The UE 100 may not have the GNSS receiver 130. Furthermore, the memory 150 may be integrally formed with the processor 160, and this set (that is, a chipset) may be called a processor 160'.

The antenna 101 and the cellular transceiver 111 are used for transmitting and receiving a cellular radio signal. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used for transmitting and receiving a WLAN radio signal. The WLAN transceiver 112 converts the baseband signal output from the processor 160 into a WLAN radio signal, and transmits the same from the antenna 102. Further, the WLAN transceiver 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding of the baseband signal and a CPU that performs various processes by executing the program stored in the memory 150. The processor 160 may further include a codec that performs encoding and decoding of sound and video signals. The processor 160 implements various processes and various communication protocols described later.

Figure 3:
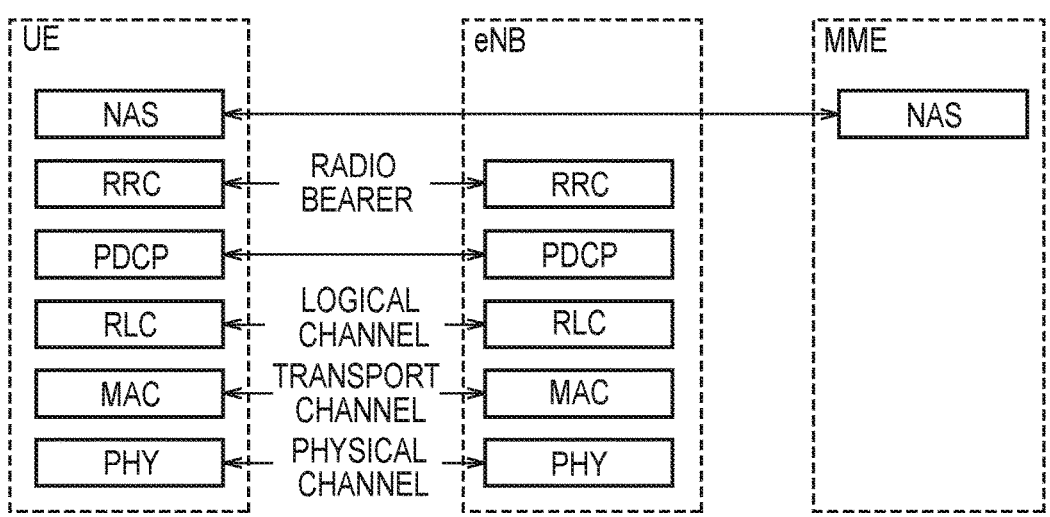
FIG. 3 is a protocol stack diagram of an LTE radio interface.

FIG. 3 is a protocol stack diagram of a radio interface in the cellular communication system. As illustrated in FIG. 3, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

In the LTE system, an OFDMA (Orthogonal Frequency Division Multiple Access) is applied to a downlink, and an SC-FDMA (Single Carrier Frequency Division Multiple Access) is applied to an uplink.

A radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Of the radio resources (time and frequency resources) assigned to the UE 100, a frequency resource can be identified by a resource block and a time resource can be identified by a subframe (or a slot).

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for deciding a transport format (a transport block size, a modulation and coding scheme, and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), and otherwise, the UE 100 is in an idle state (RRC idle state).

A NAS (Non-Access Stratum) layer positioned above the RRC layer performs session management or mobility management, for example. The MME 300 exchange NAS massages with the UE 100.

(Network Selection Operation)

In 3GPP Release 12 and later, a cellular/WLAN radio interworking technology is supported. With such a technology, the UE 100 in the RRC connected state or the RRC idle state performs a bidirectional traffic switching (traffic steering) between the E-UTRAN 10 and the WLAN 30 by a network selection operation.

The traffic switching is performed at the initiative of the UE 100 (UE based) by an aid of the E-UTRAN 10. Further, the traffic switching is performed in an APN (Access Point Name) unit.

Figure 4:
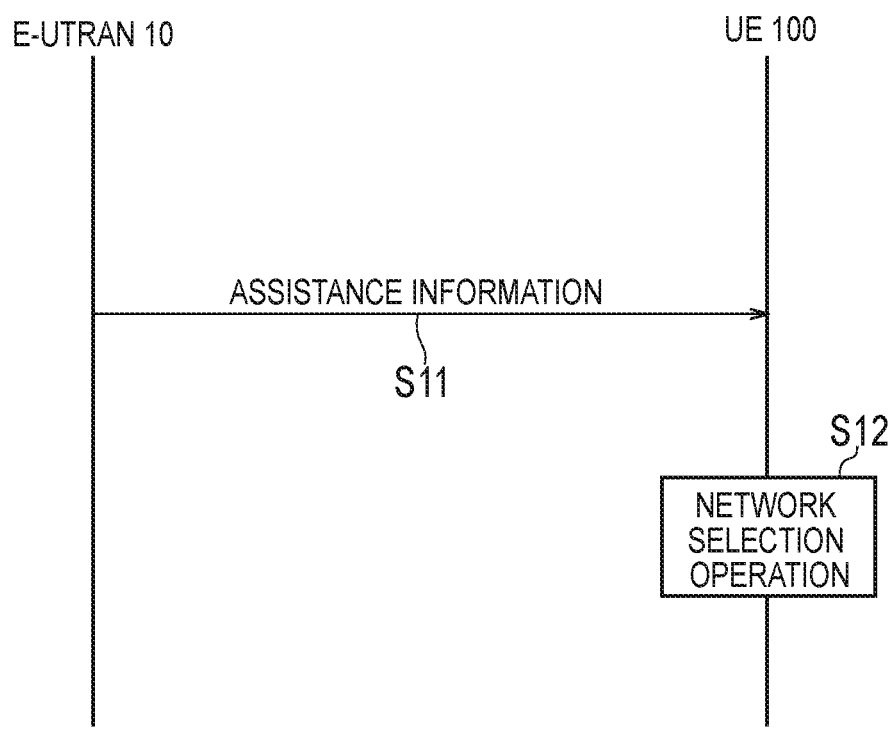
FIG. 4 is a diagram for describing a network selection operation according to the embodiment.

FIG. 4 is a diagram for describing the network selection operation.

As illustrated in FIG. 4, in step S11, the E-UTRAN 10 transmits RAN assistance information (RAN assistance parameters) to the UE 100 by a broadcast RRC signaling or a dedicated RRC signaling. The broadcast RRC signaling, for example, is an SIB (System Information Block). The dedicated RRC signaling, for example, is an RRC Connection Reconfiguration message.

The RAN assistance information includes: a strength (received power) threshold value and a quality threshold value of an E-UTRAN signal; a threshold value of a WLAN channel usage rate; a threshold value of a WLAN backhaul data rate; a strength (received power) threshold value and a quality threshold value of a WLAN signal; and the like. The RAN assistance information may include a WLAN identifier that is a target of the network selection operation. The WLAN identifier is SSID, BSSID, HESSID, and the like. The RAN assistance information may include a parameter that designates a period during which a threshold value (determination condition) should be satisfied.

The UE 100 supporting the network selection operation receives the RAN assistance information, and stores the received RAN assistance information. When performing a cell reselection or a handover, the UE 100 may discard the stored RAN assistance information.

In step S12, the UE 100 performs the network selection operation.

First of all, an example of a switching from the LTE communication to the WLAN communication, that is, a switching from the E-UTRAN 10 to the WLAN 30 will be described. The UE 100 performs a switching determination regarding whether or not to switch from the LTE communication to the WLAN communication, on the basis of a first determination condition according to the E-UTRAN 10 and a second determination condition according to the WLAN 30. Specifically, when both the first determination condition and the second determination condition are satisfied, the UE 100 performs the switching from the LTE communication to the WLAN communication.

The first determination condition is the following conditions for an E-UTRAN serving cell:

RSRPmeas <ThreshServingOffloadWLAN, LowP; or
RSRQmeas <ThreshServingOffloadWLAN, LowQ Here, "RSRPmeas" is a received power of a cellular received signal, i.e., a reference signal received power (RSRP) measured at the UE 100. "RSRQmeas" is a reception quality of cellular received signal, i.e., a reference signal reception quality (RSRQ) measured at the UE 100. "ThreshServingOffloadWLAN, LowP" and "ThreshServingOffloadWLAN, LowQ" are included in the RAN assistance information, and are threshold values for switching to the WLAN 30.

The second determination condition is the following conditions for a target WLAN:

ChannelUtilizationWLAN <ThreshChUtilWLAN, Low; and
BackhaulRateDlWLAN >ThreshBackhRateDLWLAN, High; and
BackhaulRateUlWLAN >ThreshBackhRateULWLAN, High; and
RCPI >ThreshRCPIWLAN, High; and
RSNI >ThreshRSNIWLAN, High Here, "ChannelUtilizationWLAN" is included in a WLAN beacon or a probe response, and indicates a WLAN channel usage rate, i.e., a WLAN radio load level. "BackhaulRateDlWLAN" and "BackhaulRateUlWLAN" are provided from an ANQP (Access Network Query Protocol), and indicate an available transmission rate of WLAN backhaul, i.e., a WLAN backhaul load level. "RCPI" indicates the strength of WLAN signal measured at the UE 100. "RCPI" indicates the quality of WLAN signal measured at the UE 100. "ThreshChUtilWLAN, Low", "ThreshBackhRateDLWLAN, High", "ThreshBackhRateULWLAN, High", "ThreshRCPIWLAN, High", and "ThreshRSNIWLAN, High" are included in the RAN assistance information, and are threshold values for switching to the WLAN 30.

Next, an example of a switching from the WLAN communication to the LTE communication, that is, a switching from the WLAN 30 to the E-UTRAN 10 will be described. The UE 100 performs a switching determination regarding whether or not to switch from the WLAN communication to the LTE communication, on the basis of a third determination condition according to the WLAN 30 and a fourth determination condition according to the E-UTRAN 10. Specifically, when one of the third determination condition and the fourth determination condition is satisfied, the UE 100 performs the switching from the WLAN communication to the LTE communication.

The third determination condition is the following conditions for a source WLAN:

ChannelUtilizationWLAN >ThreshChUtilWLAN, High; or
BackhaulRateDlWLAN <ThreshBackhRateDLWLAN, Low; or
BackhaulRateUlWLAN <ThreshBackhRateULWLAN, Low; or
RCPI <ThreshRCPIWLAN, Low; or
RSNI <ThreshRSNIWLAN, Low Here, "ThreshChUtilWLAN, High", "ThreshBackhRateDLWLAN, Low", "ThreshBackhRateULWLAN, Low", "ThreshRCPIWLAN, Low", and "ThreshRSNIWLAN, Low" are included in the RAN assistance information, and are threshold values for switching to the E-UTRAN 10.

The fourth determination condition is the following conditions for an E-UTRAN target cell:

RSRPmeas >ThreshServingOffloadWLAN, HighP; and
RSRQmeas >ThreshServingOffloadWLAN, HighQ Here, "ThreshServingOffloadWLAN, HighP" and "ThreshServingOffloadWLAN, HighQ" are included in the RAN assistance information, and are threshold values for switching to the E-UTRAN 10.

The above-described first to fourth determination conditions are called a RAN specified rule. The UE 100 may perform the network selection operation by applying the RAN assistance information to an advanced ANDSF policy, in addition to the RAN specified rule or in place of the RAN specified rule.

Further, the above-described first to fourth determination conditions are determination conditions in a case where the cellular communication network is the E-UTRAN 10. In addition to the E-UTRAN 10, a UTRAN that is a kind of cellular communication network also supports the network selection operation. In a case where the cellular communication network is the UTRAN, a determination condition that is different from the above-described first to fourth determination conditions may be used.

(Operation Overview of UE)

As described above, the network selection operation is an operation for selecting an appropriate network, from the E-UTRAN 10 and the WLAN 30, through which to transmit and receive traffic of the UE 100, on the basis of the RAN assistance information (RAN assistance parameters) provided from the E-UTRAN 10. The RAN assistance information is appropriately updated according to a state of the E-UTRAN 10 and the like.

In the network selection operation, it is assumed that the UE 100 is capable of acquiring the updated RAN assistance information provided from the E-UTRAN 10. That is, it is assumed that the UE 100 is in an attach state in which the UE 100 is registered with the LTE communication network (E-UTRAN 10). The attach state includes the RRC connected state and the RRC idle state.

However, when the UE 100 is in a detach state in which the UE 100 is not registered with the E-UTRAN 10, the UE 100 is not capable of acquiring the updated RAN assistance information.

Figure 5:
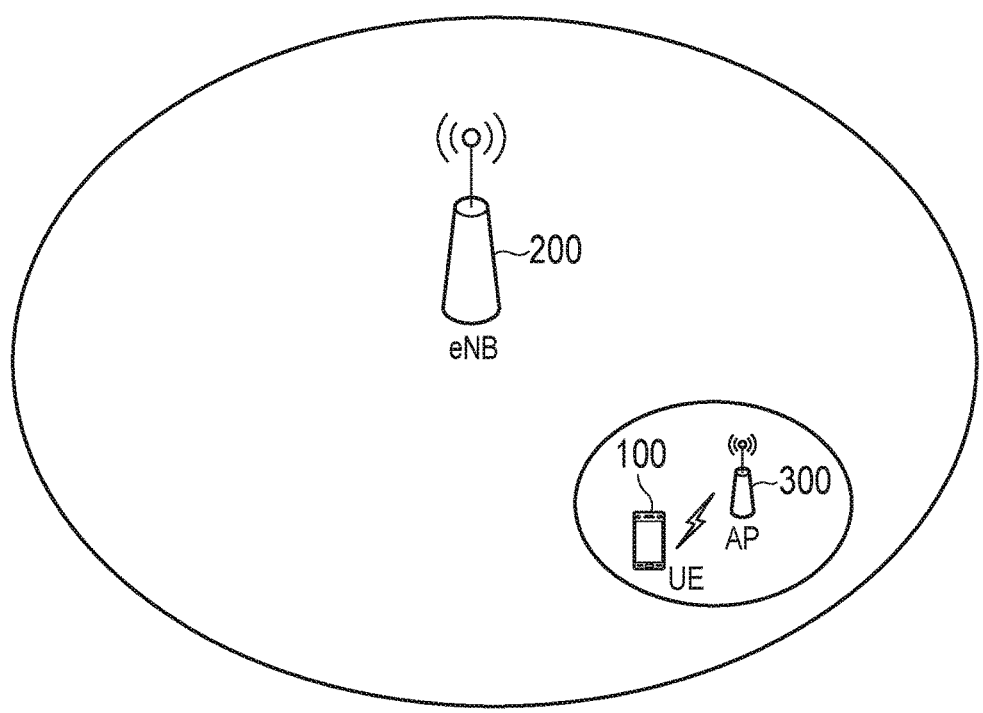
FIG. 5 is a diagram illustrating an operation environment according to the embodiment.

FIG. 5 is a diagram illustrating an operation environment according to the embodiment. As illustrated in FIG. 5, the UE 100 stores the RAN assistance information that is provided from the E-UTRAN 10 (eNB 200) in the attach state, and on the basis of the RAN assistance information, performs the network selection operation for selecting an appropriate network, from the E-UTRAN 10 (eNB 200) and the WLAN 30 (AP 300), through which to transmit and receive traffic of the UE 100.

Here, a case, in which all PDN (Packet Data Network) connections of the UE 100 are established via the E-UTRAN 10 and the UE 100 in the attach state switches all PDN connections to the WLAN 30 by the network selection operation, is assumed. Then, without reselecting the UTRAN, the UE 100 transitions to the detach state by detaching from the E-UTRAN 10.

As described above, all PDN connections are established via the WLAN 30; therefore, the UE 100 in the detach state is not capable of acquiring the updated RAN assistance information from the E-UTRAN 10.

The UE 100 according to the embodiment, when transitioning from the attach state to the detach state, continues the network selection operation while holding the RAN assistance information that is provided from the E-UTRAN 10 in the attach state. Particularly, when transitioning to the detach state and transmitting and receiving traffic to and from the WLAN 30, the UE 100 holds a WLAN determination parameter that is provided in the attach state, and performs the network selection operation on the basis of the held WLAN determination parameter.

As a result, it is possible to determine whether or not the WLAN 30 is appropriate and switch traffic to the E-UTRAN 10 in accordance with a deterioration of communication state of the WLAN communication.

It is noted that the WLAN determination parameter is a parameter according to the WLAN determination, and includes "ThreshChUtilWLAN, High", "ThreshBackhRateDLWLAN, Low", "ThreshBackhRateULWLAN, Low", "ThreshRCPIWLAN, Low", "ThreshRSNIWLAN, Low", and the like.

In the embodiment, when transitioning to the detach state and transmitting and receiving traffic to and from the WLAN 30, the UE 100 holds the WLAN determination parameter that is provided in the attach state, until a validity period is expired after transitioning to the detach state.

As a result, the network selection operation is appropriately performed in a period when the WLAN determination parameter is considered as new.

In the embodiment, the validity period is designated from the E-UTRAN 10 in the attach state. Information of the validity period is provided from the E-UTRAN 10 by the broadcast RRC signaling or the dedicated RRC signaling. The validity period may be included in the RAN assistance information. Alternatively, the validity period may be an information element different from the RAN assistance information.

As a result, the validity period can be made variable in accordance with an update frequency or an update cycle of the RAN assistance information in the E-UTRAN 10, for example. However, the validity period may be set in advance (Pre-configure) in the UE 100 and be fixed.

In the embodiment, when the validity period is expired after transitioning to the detach state, the UE 100 attempts to transition to the attach state in order to acquire the updated WLAN determination parameter provided from the E-UTRAN 10.

As a result, it is possible to acquire the updated WLAN determination parameter and appropriately perform the network selection operation.

(Example of UE Operation Flow)

FIG. 6 is an operation flow diagram of the UE 100 according to the embodiment. In an initial state, the UE 100 is in the attach state and stores the RAN assistance information provided from the E-UTRAN 10. Further, the UE 100 stores the validity period designated from the E-UTRAN 10.

As illustrated in FIG. 6, in step S101, the UE 100 is detached from the E-UTRAN 10. For example, the UE 100 switches all PDN connections to the WLAN 30, and without reselecting the UTRAN, transitions to the detach state by being detached from the E-UTRAN 10.

In step S102, the UE 100 activates a Validity timer when transitioning to the detach state. A validity period designated from the E-UTRAN 10 is set in the Validity timer.

The UE 100 holds the RAN assistance information until the Validity timer is expired. The UE 100 may not necessarily hold an LTE determination parameter, or may hold at least the WLAN determination parameter.

In step S103, the UE 100 continues the network selection operation on the basis of the held RAN assistance information (WLAN determination parameters). For example, the UE 100 continues a determination regarding whether or not to switch traffic from the WLAN 30 to the E-UTRAN 10 on the basis of the held WLAN determination parameters.

When the UE 100 determines to switch traffic from the WLAN 30 to the E-UTRAN 10 (step S104; YES) by such a network selection operation, in step S105, the UE 100 attaches to (registers with) the E-UTRAN 10, and switches traffic from the WLAN 30 to the E-UTRAN 10.

On the other hand, when the UE 100 does not determine to switch traffic from the WLAN 30 to the E-UTRAN 10 (step S104; NO) by the network selection operation, in step S106, the UE 100 confirms whether or not the Validity timer is expired.

When the Validity timer is not expired (step S106; NO), the process returns to step S103 and continues the network selection operation.

On the other hand, when the Validity timer is expired (step S106; YES), in step S107, the UE 100 transitions to the attach state by attaching to the E-UTRAN 10, and acquires the updated RAN assistance information provided from the E-UTRAN 10. The UE 100 updates the held RAN assistance information on the basis of the acquired updated RAN assistance information. When the RAN assistance information is provided for each WLAN identifier from the E-UTRAN 10, the UE 100 may acquire only RAN assistance information corresponding to the WLAN identifier of the currently selected WLAN 30.

Here, without transitioning to the RRC connected state, in the RRC idle state, the UE 100 may acquire RAN assistance information that is included in the broadcast RRC signaling. Further, the UE 100 may also acquire the updated validity period provided from the E-UTRAN 10, and update a value of the validity period.

Then, the process returns to step S101, and the UE 100 transitions to the detach state after being detached from the E-UTRAN 10.

OTHER EMBODIMENTS

In the above-described embodiment, when the Validity timer was expired, the UE 100 transitioned to the attach state by attaching to the E-UTRAN 10, and acquired the updated RAN assistance information provided from the E-UTRAN 10. However, the UE 100 may acquire the updated RAN assistance information before the Validity timer is expired. Further, the UE 100 may transition to the RRC idle state without attaching to the E-UTRAN 10, and acquire the updated RAN assistance information.

In above-described embodiment, a case, in which the UE 100 in the attach state switched all PDN connections to the WLAN 30, and without reselecting the UTRAN, transitioned to the detach state by being detached from the E-UTRAN 10, was assumed.

In other embodiments, an operation environment as illustrated in FIG. 7 is assumed. As illustrated in FIG. 7, a case, in which the UE 100 switches all PDN connections to the WLAN 30, reselects a GERAN (GSM EDGE Radio Access Network) 40 in order to receive a voice service, and transitions to the detach state (LTE detach state) by being detached from the E-UTRAN 10, is assumed.

The GERAN 40 is a kind of cellular communication network, but does not support the network selection operation. That is, the GERAN 40 does not have a capability of providing the RAN assistance information. In such a case, if the UE 100 has a capability of simultaneously using two RANs, then the UE 100 is capable of performing much the same operation as that of the above-described embodiment without interrupting the voice service by the GERAN 40.

However, the UE 100 that does not have the capability of simultaneously using two RANs needs to interrupt the voice service by the GERAN 40 in order to acquire the updated RAN assistance information from the E-UTRAN 10. Thus, such a UE 100 may not follow the operation flow according to the above-described embodiment in order to prevent interruption of the voice service.

APPENDIX

1. Introduction

Specification of WLAN/3GPP Radio interworking is developed on the assumption that UE can obtain up-to-date RAN assistance information. UE can apply the information to RAN specified rules or enhanced ANDSF policy. However, 2 realistic scenarios that UE cannot obtain up-to-date RAN assistance information are pointed out:

When a UE, whose voice setting indicate that the UE has to obtain voice services, offloads all the PDN connections to WLAN and reselects to GERAN to obtain voice services When a UE offloads all the PDN connections to WLAN and detached from E-UTRAN without reselecting to UTRAN This appendix discusses how UE should behave in such cases.

2. Discussion

In principle, the case that RAN assistance information cannot be obtained is out of scope of the items of specification. However, the pointed out scenarios is realistic. It is worth discussing how UE behaves if up-to-date RAN assistance information cannot be obtained.

2.1. GERAN Voice Service Scenario

In this sub-clause the first question, voice service on GERAN case, is discussed.

When a UE, whose voice setting indicate that the UE has to obtain voice services, offloads all the PDN connections to WLAN and reselects to GERAN to obtain voice services If UE is only ISMP capable, traffic cannot be supported on both WLAN and GERAN simultaneously. With the assumption that voice service on GERAN is prioritized, all the PDN connections in WLAN should be steered to GERAN if possible or released prior to reselection to GERAN.

Observation: For ISMP capable UEs, traffic from WLAN may be steered to GERAN by implementation if supported or released, if GERAN is reselected due to e.g. voice service prioritization.

However, if the UE is ISRP capable, it is possible for the UE to reselect GERAN for voice service while keeping other traffic in WLAN. Of course it is assumed that voice service and the other traffic belong to different APN since it has already agreed on APN level traffic steering granularity.

Then the question is how the UE considers whether the WLAN is acceptable or not without most up-to-date RAN assistance information.

One of the possible UE behavior is that UE attempts to obtain most up-to-date RAN assistance information again through reselection of UTRAN/E-UTRAN. However, it is not desirable for the UE to reselect UTRAN/E-UTRAN while GERAN voice service is still active for service continuity. It is assumed that the voice service on GERAN has higher priority than other traffic services based on the service provisioning within the UE.

There are 2 alternatives in this case.

1: After service on GERAN is finished, UE attempts to attach to UTRAN/E-UTRAN and obtain most up-to-date RAN assistance information.

2: UE discards RAN assistance information when UE reselect GERAN and UE behavior is up to UE implementation.

In alternative 1, it is not clear which UE should steer traffic from WLAN or not. From offloading point of view, it is better that UE's traffic is kept in the WLAN unless the WLAN begins to deteriorate. In order to evaluate the WLAN, keeping RAN assistance information may be useful for an appropriate time. However, during voice service on GERAN, RAN assistance information may be updated in original UTRAN/E-UTRAN cell. So it is difficult for UE to carry out appropriate decision without up-to-date RAN assistance information within RAN specified metrics.

Proposal 1: It should be up to UE implementation how/when traffic is steered from WLAN for service continuity on GERAN.

2.2. Detachment from E-UTRAN without reselecting to UTRAN

When a UE offloads all the PDN connections to WLAN and detached from E-UTRAN without reselecting to UTRAN Under this condition it is clear the UE would not be able to receive up-to-date RAN assistance information since it is not attached to UTRAN or E-URTAN. Then the question is what the UE should do with the existing RAN assistance information. The UE has two alternatives and the choice may impact ability for the UE to retain the existing traffic without interruption.

1: UE discards the RAN assistance information.

2: UE keeps the RAN assistance information.

2.2.1. UE discards the RAN assistance information

This alternative is the simple and reasonable. If the UE is not attached to UTRAN or E-UTRAN it doesn't appear to be reasonable for the UE to retain the RAN assistance information that may be have already been updated by RAN. So from this perspective the RAN parameters should only be valid when the UE is still attached to UTRAN/E-UTRAN. However, it is still unclear how the UE behaves after discarding those parameters. Would the UE be allowed to steer traffic back to RAN in case the WLAN deteriorates? And if the UE discards the RAN assistance information, how would the UE use as the criteria to determine whether the WLAN is acceptable or not? Therefore, if UE discards the RAN assistance information it should be assumed that the WLAN condition and the need to steer traffic to RAN would be based on UE implementation.

2.2.2. UE keeps the RAN assistance information

With this alternative, the UE may use the existing RAN assistance information to evaluate the condition of the WLAN while traffic remains in the WLAN. Since it is assumed the UE is not attached to UTRAN/E-UTRAN, only the WLAN related parameters should be applicable, i.e., $Thresh_{ChUtilWLAN, High}$, $Thresh_{BackhRateDLWLAN, Low}$, $Thresh_{BackhRateULWLAN, Low}$, $Thresh_{RCPIWLAN, Low}$, and $Thresh_{RSNIWLAN, Low}$. Although these thresholds are not up-to-date it may be beneficial to use these thresholds, at least for some time esp, since the WLAN related thresholds are not expected to change dynamically.

Proposal 2: If the UE is detached from UTRAN/E-UTRAN, the UE should keep the WLAN related RAN assistance information to determine the condition of the WLAN.

If Proposal 2 is agreeable, RAN2 should also consider if it is necessary to define a validity period for the existing WLAN related RAN assistance information. We considered the following two alternatives:

a) The UE may keep the WLAN related RAN assistance information until WLAN has deteriorated beyond the condition based on the thresholds from the existing RAN assistance information.

b) The RAN could determine a validity period of the WLAN related RAN assistance information using a timer.

With alternative a), the UE has the option keep the WLAN related RAN assistance information until WLAN deteriorates significantly based on these parameters. At this point the UE would need to attach to UTRAN or E-UTRAN to obtain the up-to-date RAN assistance information and determine whether the UE should steer traffic to RAN. In case the UE cannot attach to either UTRAN or E-UTRAN due to e.g., no longer in RAN coverage, the UE should discard the existing RAN assistance information.

With alternative b) the validity timer is started when the UE is detached from UTRAN/E-UTRAN and as long as the timer is still running, the UE should continue to use the existing RAN assistance information. Upon timer expiry the UE should attach to UTRAN/E-UTRAN to get the up-to-date RAN assistance information. Although it may be difficult for network to decide the appropriate value for the validity timer based on the possibility of WLAN deterioration, the duration of the validity timer may be based on the frequency of update of the RAN assistance information.

In comparison, alternative a) provides some flexibility for the UE to keep the existing parameters for an indefinite period of time, while alternative b) provides a definite period for the existing parameters. If the UE is stationary and remain in WLAN for an extended period of time, there wouldn't be any opportunity for the UE to steer traffic back to RAN which may not be desirable for operators. Therefore, alternative b) should be adopted as the means to define the validity period for the WLAN related RAN assistance information.

Proposal 3: If the UE is detached from UTRAN/E-UTRAN, the UE should keep the WLAN related RAN assistance information for the duration of a validity timer as defined by RAN.

Proposal 4: Upon validity timer expiry, the UE should attempt to attach to UTRAN/E-UTRAN to obtain the up-to-date RAN assistance information.

The existing traffic steering rule assumes that the UE may need to steer traffic back to RAN even if WLAN condition has not deteriorated. However, if Proposals 3 and 4 are agreeable, this also means the UE will not try to attach and connect to UTRAN/E-UTRAN if WLAN is in "good" condition, based on the existing WLAN threshold criteria. In other words, if the UE is not attached or connected to UTRAN/E-UTRAN, then the UE may miss the opportunity to steer back to RAN when the WLAN is still good. However, this may be a reasonable compromise since one of the requirements of this work item is to improve utilization of WLAN. It is not preferable for the UE to attempt to steer traffic back even though WLAN is still acceptable and the UE is detached from UTRAN/E-UTRAN.

Observation 2: If detached from UTRAN/E-UTRAN, the UE is not required to steer traffic to RAN unless the WLAN condition deteriorates beyond the WLAN threshold values.

With the understanding in Observation 2 it also means the UE has the option to attach to UTRAN/E-UTRAN to obtain the up-to-date WLAN assistance parameters before the expiry of the validity timer.

Proposal 5: The UE has the option to attach to UTRAN/E-UTRAN to obtain the up-to-date WLAN assistance parameters before the expiry of the validity timer.

INDUSTRIAL APPLICABILITY

The present invention is useful in the field of mobile communication.

The invention claimed is:

1. A user equipment comprising:
a first communication unit configured to perform a first communication with a base station provided in a cellular communication network;
a second communication unit configured to perform a second communication with an access point provided in a WLAN (Wireless Local Area Network); and
a controller configured to perform a cellular/WLAN interworking to perform a switch between the first communication and the second communication; wherein
the controller is further configured to perform the switch between the first communication and the second communication based on a RAN (Radio Access Network) assistance parameter provided from the cellular communication network, and
the controller is further configured to determine, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

2. The user equipment according to claim 1, wherein
the controller is further configured to determine whether to perform the switch from the second communication to the first communication based on the first RAN assistance parameter until the elapse of the predetermined time.

3. The user equipment according to claim 1, wherein the controller is further configured to update the first RAN assistance parameter by the second RAN assistance parameter upon the elapse of the predetermined time.

4. The user equipment according to claim 1, wherein the second RAN assistance parameter is the RAN assistance parameter broadcasted from the cellular communication network when the user equipment is in an RRC (Radio Resource Connection) idle state.

5. The user equipment according to claim 1, wherein the first RAN assistance parameter is the RAN assistance parameter unicasted from the cellular communication network when the user equipment is in an RRC (Radio Resource Connection) connected state.

6. The user equipment according to claim 1, wherein the predetermined time is designated by the cellular communication network or preconfigured.

7. A communication control method comprising the steps of:
(a) performing a first communication with a base station provided in a cellular communication network;
(b) performing a second communication with an access point provided in a WLAN (Wireless Local Area Network); and
(c) performing a cellular/WLAN interworking to perform a switch between the first communication and the second communication; wherein
the step (c) includes a step of performing the switch between the first communication and the second communication based on a RAN (Radio Access Network) assistance parameter provided from the cellular communication network, and
the step (c) includes a step of determining, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

8. A chipset used for a user equipment comprising a first communication unit configured to perform a first communication with a base station provided in a cellular communication network and a second communication unit configured to perform a second communication with an access point provided in a WLAN (Wireless Local Area Network), the chipset comprising:
a controller configured to perform a cellular/WLAN interworking to perform a switch between the first communication and the second communication; wherein
the controller is further configured to perform the switch between the first communication and the second communication based on a RAN (Radio Access Network) assistance parameter provided from the cellular communication network, and
the controller is further configured to determine, after an elapse of a predetermined time from an event that all of the first communication was switched to the second communication based on a first RAN assistance parameter provided as the RAN assistance parameter, whether to perform a switch from the second communication to the first communication based on a second RAN assistance parameter newly provided as the RAN assistance parameter.

* * * * *